United States Patent
Chong et al.

(10) Patent No.: US 10,361,586 B2
(45) Date of Patent: Jul. 23, 2019

(54) METHOD OF WIRELESSLY TRANSFERRING POWER

(71) Applicant: MOTOROLA SOLUTIONS, INC., Schaumburg, IL (US)

(72) Inventors: Chee Khon Chong, Penang (MY); Sin Keng Lee, Penang (MY); Teik Siew Tan, Penang (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 688 days.

(21) Appl. No.: 14/983,372

(22) Filed: Dec. 29, 2015

(65) Prior Publication Data

US 2017/0187238 A1   Jun. 29, 2017

(51) Int. Cl.
 *H02J 50/10* (2016.01)
 *H02J 50/50* (2016.01)
 *H02J 7/02* (2016.01)
 *H02J 50/12* (2016.01)

(52) U.S. Cl.
 CPC .............. *H02J 50/10* (2016.02); *H02J 7/025* (2013.01); *H02J 50/12* (2016.02); *H02J 50/50* (2016.02)

(58) Field of Classification Search
 CPC .................................... H02J 7/02; H02J 7/025
 See application file for complete search history.

(56) References Cited

U.S. PATENT DOCUMENTS

| 9,112,363 B2 | 8/2015 | Partovi | |
| 2014/0021798 A1* | 1/2014 | Kesler | H02J 17/00 307/104 |
| 2014/0176384 A1* | 6/2014 | Yosui | H01Q 7/06 343/788 |
| 2014/0312702 A1* | 10/2014 | Uchida | H02J 17/00 307/80 |

(Continued)

FOREIGN PATENT DOCUMENTS

WO    2015020992    2/2015

OTHER PUBLICATIONS

Jadidian et al., "Magnetic MIMO: How to Charge Your Phone in Your Pocket," article (2014) pp. 495-506, http://www.sigmobile.org/mobicom/2014/.
PCT/US2016/065147 International Search Report and Written Opinion of the International Searching Authority dated Mar. 14, 2017 (13 pages).

*Primary Examiner* — Jared Fureman
*Assistant Examiner* — Emmanuel Dominique
(74) *Attorney, Agent, or Firm* — Michael Best & Friedrich LLP

(57) ABSTRACT

A wireless power transfer device including a first power amplifier configured to generate a first drive signal, a second power amplifier configured to generate a second drive signal, a first transmitter coil configured to generate a first magnetic field having a first magnitude in response to receiving the first drive signal, and a second transmitter coil configured to generate a second magnetic field having a second magnitude in response to receiving the second drive signal. The wireless power transfer device also includes a (Continued)

repeater coil magnetically coupled to the first transmitter coil and the second transmitter coil, and configured to generate a third magnetic field having a third magnitude. The third magnitude is greater than the first magnitude and greater than the second magnitude. The repeater coil is configured to magnetically transfer power to an external device.

25 Claims, 6 Drawing Sheets

(56) References Cited

U.S. PATENT DOCUMENTS

| | | | | |
|---|---|---|---|---|
| 2014/0333148 | A1* | 11/2014 | Uchida | H02J 5/005 |
| | | | | 307/104 |
| 2015/0063825 | A1* | 3/2015 | Yamase | H04B 10/5053 |
| | | | | 398/154 |
| 2015/0323694 | A1* | 11/2015 | Roy | H02J 17/00 |
| | | | | 307/104 |
| 2015/0333801 | A1* | 11/2015 | Hosotani | H01F 38/14 |
| | | | | 307/104 |
| 2016/0064988 | A1* | 3/2016 | Ku | H02J 7/025 |
| | | | | 320/108 |
| 2017/0237340 | A1* | 8/2017 | Long | H02M 1/4258 |
| | | | | 307/82 |

* cited by examiner

_METHOD OF WIRELESSLY TRANSFERRING POWER_

BACKGROUND OF THE INVENTION

Interest for wireless power transfer has been growing recently. Additionally, there are various applications for wireless power transfer such as, for example, charging of batteries in small electronic devices (e.g., smart telephones, tablet computers, and the like), electric vehicles, and/or other electronic devices. Wireless power transfer (WPT) may be achieved in a number of ways. One wireless power transfer technology is magnetic-resonance power transfer.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
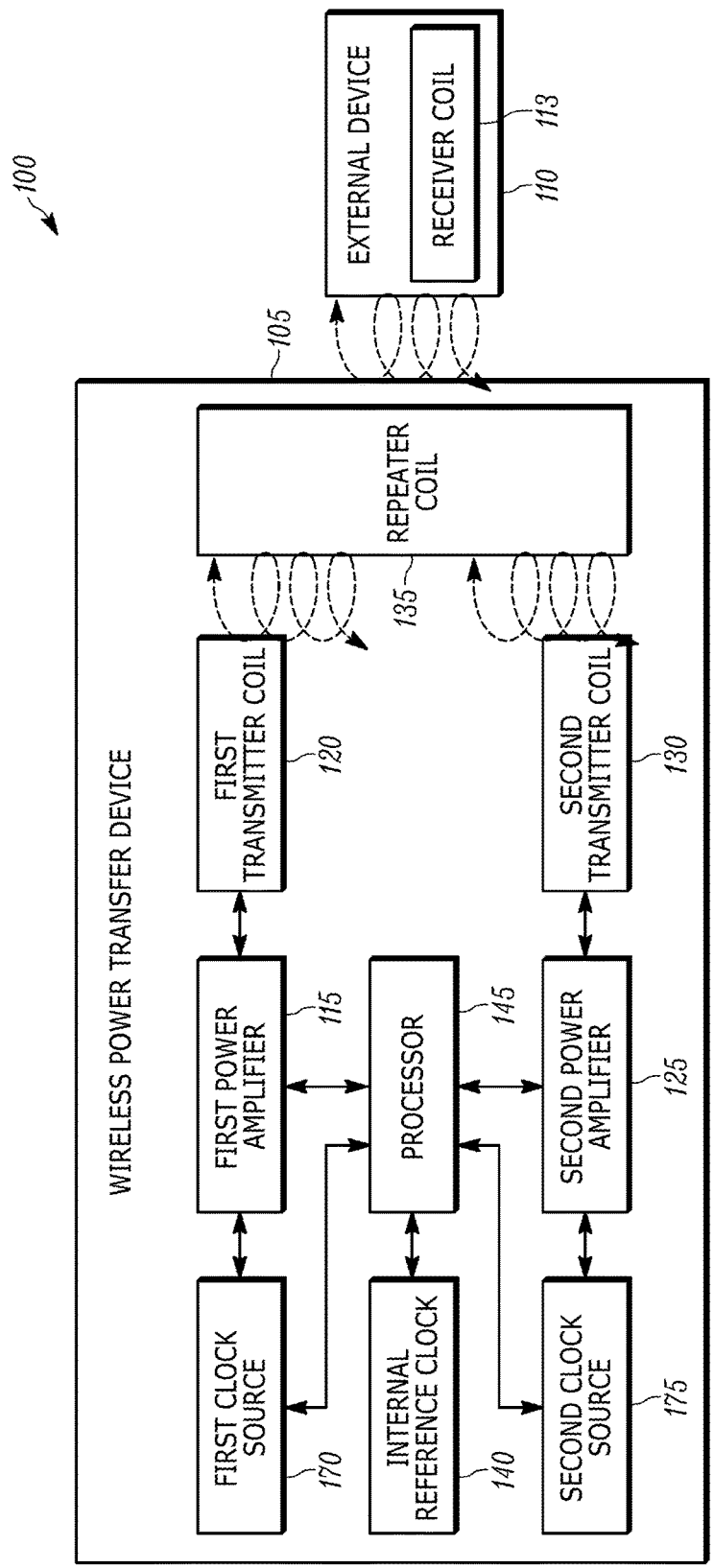
FIG. 1 is a block diagram of a wireless power transfer system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One embodiment provides a wireless power transfer device that includes a first power amplifier configured to generate a first drive signal, and a second power amplifier configured to generate a second drive signal. In one particular instance, the wireless power transfer device also includes a first transmitter coil electrically coupled to the first power amplifier, a second transmitter coil electrically coupled to the second power amplifier, and a repeater coil magnetically coupled to the first transmitter coil and the second transmitter coil. The first transmitter coil is configured to generate a first magnetic field having a first magnitude in response to receiving the first drive signal. The second transmitter coil is configured to generate a second magnetic field having a second magnitude in response to receiving the second drive signal. The repeater coil is configured to generate a third magnetic field having a third magnitude. The third magnitude is greater than the first magnitude and is also greater than the second magnitude. The repeater coil is also configured to magnetically transfer power to an external device.

Another embodiment provides a method of wirelessly transferring power with a wireless power transfer device. The wireless power transfer device includes a first transmitter coil, a second transmitter coil, and a repeater coil. In one instance, the method includes electrically coupling a first power amplifier to the first transmitter coil, generating a first drive signal with the first power amplifier, and generating, with the first transmitter coil, a first magnetic field having a first magnitude in response to receiving the first drive signal. The method also includes electrically coupling a second power amplifier to the second transmitter coil, generating a second drive signal with the second power amplifier, and generating, with the second transmitter coil, a second magnetic field having a second magnitude in response to receiving the second drive signal. The method further includes magnetically coupling the first transmitter coil and the second transmitter coil with the repeater coil, and generating, with the repeater coil, a third magnetic field having a third magnitude. The third magnitude is greater than the first magnitude and is also greater than the second magnitude.

Another embodiment provides a wireless power transfer system. In one instance, the system includes a wireless power transfer device that has a wireless power transfer array. The wireless power transfer array includes a first plurality of power amplifiers configured to generate a first plurality of drive signals, a first plurality of transmitter coils configured to generate a first plurality of magnetic fields, each transmitter coil electrically coupled to one of the first plurality of power amplifiers, each magnetic field being phase aligned to be additively combined with the other magnetic fields from the first plurality of magnetic fields, and a first repeater coil. The first repeater coil is magnetically coupled to the first plurality of transmitter coils and configured to additively combine the first plurality of magnetic fields. The wireless power transfer device is configured to transfer power to a predetermined power transfer area and within a predetermined power transfer distance. The system also includes an external device including a receiver coil magnetically coupled to the first repeater coil and configured to receive wireless power from the wireless power transfer device when the receiver coil is positioned within the predetermined power transfer area and the predetermined power transfer distance.

FIG. 1 illustrates a wireless power transfer system 100 including a wireless power transfer device 105 and an external device 110. In the example illustrated, the external device 110 includes, among other things, a receiver coil 113. The receiver coil 113 magnetically couples to the wireless power transfer device 105 to receive electrical power from the wireless power transfer device 105. The external device 110 may be, for example, a battery. The battery may be located in a smart telephone, a tablet computer, or other electrical device. For the sake of simplicity, the particular components of the external device 110 are not shown, but are understood by one of skill in the art.

In the embodiment illustrated, the wireless power transfer device 105 transfers power wirelessly to the external device 110 through magnetic resonance. In magnetic-resonance power transfer, a transmitter coil receives power from, for example, a power amplifier, and generates a magnetic field. A receiver coil is placed in close proximity to the transmitter coil, and magnetically couples to the transmitter coil to receive electrical power from the transmitter coil. In magnetic-resonance power transfer, the distance between the transmitter coil and the receiver coil (i.e., the power transfer distance) is typically within a few centimeters (cm). Performing efficient power transfer at greater distances when using magnetic-resonance power transfer is challenging because the strength of the magnetic field generated by the transmitter coil decreases rapidly as the power transfer distance increases.

As shown in FIG. 1, the wireless power transfer device 105 includes a first power amplifier 115, a first transmitter coil 120, a second power amplifier 125, a second transmitter coil 130, a repeater coil 135, an internal reference clock 140, and an electronic processor 145. The wireless power transfer device 105 may also include a housing (not shown) that supports the first power amplifier 115, the first transmitter coil 120, the second power amplifier 125, the second transmitter coil 130, the repeater coil 135, the internal reference clock 140, and the electronic processor 145.

Figure 2A:
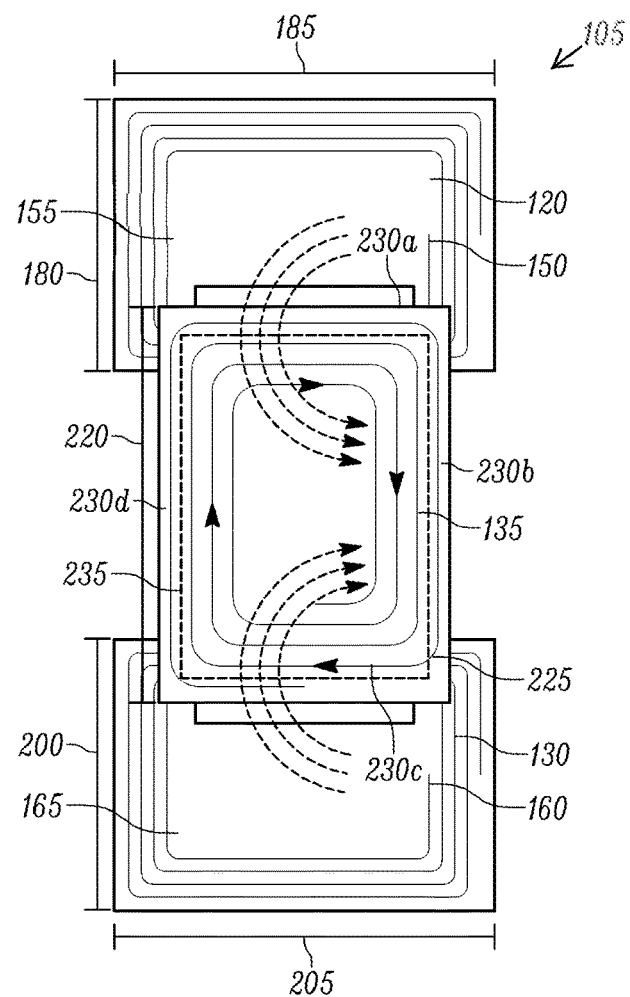
FIGS. 2A and 2B are diagrams of a wireless power transfer device of the wireless power transfer system of FIG. 1.

As shown in FIG. 2A, the first transmitter coil 120 includes a first looped wire (e.g., a copper wire and the like) having a first positive terminal 150 and a first negative terminal 155. The first transmitter coil 120 is electrically coupled to the first power amplifier 115. The first power amplifier 115 generates a first drive signal having a first magnitude and a first phase that is provided to the first transmitter coil 120. The first transmitter coil 120 generates a first magnetic field in response to receiving the first drive signal from the first power amplifier 115. The second transmitter coil 130 also includes a second looped wire (e.g., a copper wire and the like) having a second positive terminal 160 and a second negative terminal 165. The second transmitter coil 130 is electrically coupled to the second power amplifier 125. The second power amplifier 125 generates a second drive signal having a second magnitude and a second phase that is provided to the second transmitter coil 130. The second transmitter coil 130 generates a second magnetic field in response to receiving the second drive signal from the second power amplifier 125.

The first power amplifier 115 and the second power amplifier 125 are electrically coupled to a first clock source 170 and a second clock source 175, respectively. In the illustrated embodiment, the first clock source 170 and the second clock source 175 operate within the frequency range of 6.765 Megahertz (MHz) to 6.795 Megahertz. In some embodiments, the first clock source 170 and the second clock source 175 may operate in different frequency ranges. The first clock source 170 and the second clock source 175 are electrically coupled to the internal reference clock 140 such that the first drive signal and the second drive signal are synchronized according to the internal reference clock 140. In the illustrated embodiment, the internal reference clock 140 operates at a frequency of 34.56 Megahertz. In some embodiments, the internal reference clock 140 may operate at a different frequency. Additionally, the first drive signal and the second drive signal are phase aligned such that the second magnetic field has a phase difference with respect to the first magnetic field that maximizes a combination of the first magnetic field and the second magnetic field. In one embodiment, the first power amplifier 115 generates the first drive signal at a reference phase angle, while the second power amplifier 125 generates the second drive signal at a phase angle of 330 degrees. In some embodiments, the specific phase angle between the first drive signal and the second drive signal is different based on, for example, the placement of the first transmitter coil 120 and the second transmitter coil 130 with respect to each other and to the repeater coil 135.

The repeater coil 135 is magnetically coupled to the first transmitter coil 120 and to the second transmitter coil 130. Notably, the repeater coil 135 is not electrically connected to the first power amplifier 115 or to the second power amplifier 125. The repeater coil 135 includes a high quality ("Q") factor to ensure a strong magnetic coupling between the first transmitter coil 120 and the repeater coil 135, and between the second transmitter coil 130 and the repeater coil 135. The quality factor is a dimensionless parameter that indicates the energy losses within a resonant element (e.g., the repeater coil 135). The higher the quality factor, the lower the rate of energy loss. Because of its high quality factor, the repeater coil 135 additively combines the first magnetic field with the second magnetic field and efficiently (e.g., with minimal energy loss) generates a third magnetic field. The second magnetic field has a phase difference of 330 degrees with respect to the first magnetic field due to the phase difference between the first drive signal and the second drive signal. In some embodiments, the phase difference between the first magnetic field and the second magnetic field based on, for example, the placement of the first transmitter coil 120 and the second transmitter coil 130 with respect to each other and to the repeater coil 135. The repeater coil 135 generates, in response to combining the first magnetic field and the second magnetic field, the third magnetic field having a third magnitude. The phase difference between the first magnetic field and the second magnetic field allows the first magnetic field and the second magnetic field to be additively combined, which maximizes the third magnitude of the third magnetic field. Therefore, the third magnitude of the third magnetic field is, in an ideal configuration, equal to a sum of the first magnitude of the first magnetic field and the second magnitude of the second magnetic field. Because, however, the first transmitter coil 120, the second transmitter coil 130, the first power amplifier 115, the second power amplifier 125, the repeater coil 135 and the like are not ideal components, the third magnitude of the third magnetic field may be slightly less than the exact sum of the first magnitude of the first magnetic field and the second magnitude of the second magnetic field. When the receiver coil 113 is within a power transfer area and within a power transfer distance, the receiver coil 113 is magnetically coupled to the repeater coil 135. As a consequence, electrical power is transferred from the wireless power transfer device 105 to the receiver coil 113.

Figure 2B:
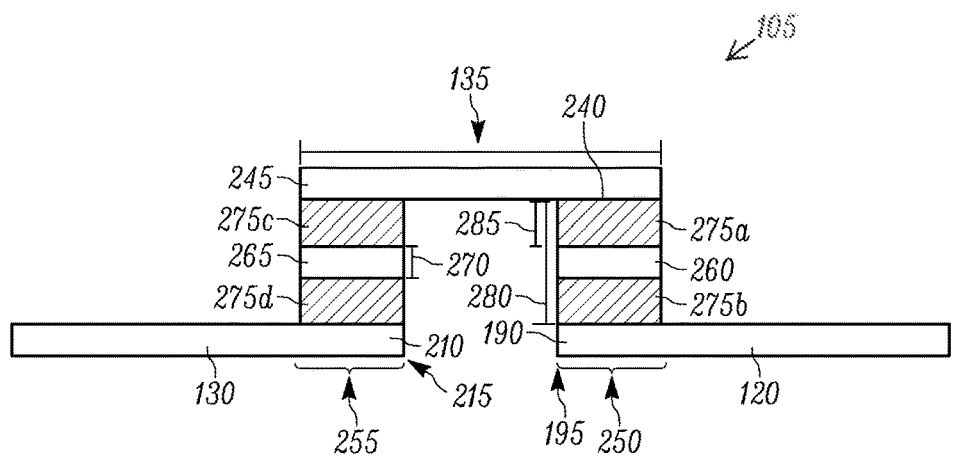

In one particular embodiment, as shown in FIG. 2A, the first transmitter coil 120 has a first length 180 of eighteen (18) centimeters (cm) and a first width 185 of twelve (12) centimeters. It should be understood; however, that these dimensions (as well as other dimensions provided herein) are examples and that different dimensions could be used. As shown in FIG. 2B, the first transmitter coil 120 also includes a first portion 190 located at a first longitudinal end 195 of the first transmitter coil 120 along the first length 180. In the illustrated embodiment, the second transmitter coil 130 has a similar construction as the first transmitter coil 120. For example, as shown in FIG. 2A, the second transmitter coil 130 has a second length 200 of eighteen centimeters and a second width 205 of twelve centimeters. Again, these dimension are examples and different dimensions can alternatively be used. As shown in FIG. 2B, the second transmitter coil 130 also includes a second portion 210 located at a second longitudinal end 215 of the second transmitter coil 130 along the second length 200. In other embodiments, the first portion 190 of the first transmitter coil 120 is aligned along the first width 185 and the second portion 210 the second transmitter coil 130 is aligned along the second width 205.

Referring back to FIG. 2A, the repeater coil 135 has a third length 220 of sixteen (16) centimeters and a third width 225 of ten (10) centimeters. The repeater coil 135 has a first plurality of edges 230a through 230d defining a perimeter 235 of the repeater coil 135. In the illustrated embodiment, the repeater coil 135 has a rectangular shape. In other embodiments, however, the repeater coil 135 may have a different shape (e.g., triangular, hexagonal, and the like) and/or may have different dimensions to those described above. As shown in FIG. 2B, the repeater coil 135 has a third portion 240 located at one of the edges 230a along the third width 225, and a fourth portion 245 located at another one of the edges 230c along the third width 225.

As shown in FIG. 2B, the first transmitter coil 120 is positioned such that the third portion 240 of the repeater coil 135 overlaps the first portion 190 of the first transmitter coil 120 in a first overlap region 250 (i.e., the third portion 240 and the first portion 190 overlap in the first overlap region 250). The second transmitter coil 130 is positioned such that the fourth portion 245 of the repeater coil 135 overlaps the second portion 210 of the second transmitter coil 130 in a second overlap region 255 (i.e., the second portion 210 and the fourth portion 245 overlap in the second overlap region 255). As shown in FIG. 2B, the size of the first overlap region 250 and the second overlap region 255 is smaller than the size of the first transmitter coil 120, smaller than the size of the second transmitter coil 130, and smaller than the size of the repeater coil 135. In other words, the first transmitter coil 120, the second transmitter coil 130, and the repeater coil 135 are only partially overlapped. The sizes (e.g., area and dimensions) of the first overlap region 250 and of the second overlap region 255 are not arbitrary, and are determined based on, for example, one or more of the geometry of the first transmitter coil 120; the geometry of the second transmitter coil 130; the geometry of the repeater coil 135; the number of turns of the first transmitter coil 120, the second transmitter coil 130, and/or the repeater coil 135; the width of turns of the first transmitter coil 120, the second transmitter coil 130, and/or the repeater coil 135; and the spacing between the turns of the first transmitter coil 120, the second transmitter coil 130, and/or the repeater coil 135, among other things.

As shown in FIG. 2B, the wireless power transfer device 105 also includes a first flux concentrator 260 that concentrates a first magnetic flux between the first transmitter coil 120 and the repeater coil 135. In other words, the first flux concentrator 260 maximizes the magnetic flux coupling between the first transmitter coil 120 and the repeater coil 135 while minimizing magnetic losses in the coupling. In the illustrated embodiment, the first flux concentrator 260 is aligned with the first overlap region 250 and is positioned between the first transmitter coil 120 and the repeater coil 135. In this position, due to its material properties, the first flux concentrator 260 can improve the return loss when the first transmitter coil 120 and the repeater coil 135 are magnetically coupled. The wireless power transfer device 105 also includes a second flux concentrator 265 that concentrates a second magnetic flux between the second transmitter coil 130 and the repeater coil 135. In other words, the second flux concentrator 265 maximizes the magnetic flux coupling between the second transmitter coil 130 and the repeater coil 135 while minimizing magnetic losses in the coupling. In the illustrated embodiment, the second flux concentrator 265 is aligned with the second overlap region 255 and is positioned between the second transmitter coil 130 and the repeater coil 135. In this position, due to its material properties, the second flux concentrator 265 can improve the return loss when the second transmitter coil 130 and the repeater coil 135 are magnetically coupled. In the illustrated embodiments, the first flux concentrator 260 and the second flux concentrator 265 include a ferrite layer. The first flux concentrator 260 and the second flux concentrator 265 have a high permeability (e.g., 120) and low-loss factor (e.g., 0.017). In the illustrated embodiment of FIG. 2B the first flux concentrator 260 and the second flux concentrator 265 each have a height 270 of 0.3 mm (millimeters). In some embodiments, the first flux concentrator 260 and/or the second flux concentrator 265 each may have a different height.

In the embodiment illustrated in FIG. 2B, the wireless power transfer device 105 includes a first insulation layer 275a, a second insulation layer 275b, a third insulation layer 275c, and a fourth insulation layer 275d that separate the first transmitter coil 120 from the repeater coil 135, and the second transmitter coil 130 from the repeater coil 135. The first insulation layer 275a, the second insulation layer 275b, the third insulation layer 275c, and the fourth insulation layer 275d include a passive material and are used to keep the first transmitter coil 120 and the second transmitter coil 130 at an appropriate distance 280 apart from the repeater coil 135, keep the first flux concentrator 260 at an appropriate distance from the repeater coil 135 and from the first transmitter coil 120, and keep the second flux concentrator 265 at an appropriate distance from the repeater coil 135 and from the second transmitter coil 130. In one exemplary embodiment, each insulation layer 275a through 275d has a height 285 of six (6) millimeters. In some embodiments, each insulation layer 275a through 275d may have a different height. As shown in FIG. 2B, the first flux concentrator 260 is positioned between the first insulation layer 275a and the second insulation layer 275b while the second flux concentrator 265 is positioned between the third insulation layer 275c and the fourth insulation layer 275d.

The distance 280 between the first transmitter coil 120 and the repeater coil 135, and the second transmitter coil 130 and the repeater coil 135 is not arbitrary, and is determined based on, for example, one or more of the geometry of the first transmitter coil 120, the second transmitter coil 130, and/or the repeater coil 135, the number of turns in the first transmitter coil 120, the second transmitter coil 130, and/or the repeater coil 135, and the like. In the illustrated embodiment, the distance 280 between the first transmitter coil 120 and the repeater coil 135, and between the second transmitter coil 130 and the repeater coil 135 is fifteen (15) millimeters. Since the components used (i.e., the insulation layers 275a through 275d, the first flux concentrator 260, and the second flux concentrator 265) are not ideal, the distance 280 between the first transmitter coil 120 and the repeater coil 135, and between the second transmitter coil 130 and the repeater coil 135 may be slightly less or slightly more than fifteen millimeters. In some embodiments, the distance between the first transmitter coil 120 and the repeater coil 135, and between the second transmitter coil 130 and repeater coil 135 may be different than the fifteen millimeters. Additionally, since the first transmitter coil 120, the second transmitter coil 130, and the repeater coil 135 are generally flat (e.g., their respective heights are negligible), the assembly (i.e., the first transmitter coil 120, the second transmitter coil 130, the first flux concentrator 260, the second flux concentrator 265, the insulation layers 275a through 275d, and the repeater coil 135) also have a height of fifteen millimeters, with some variation since the components used are not ideal.

Figure 3:
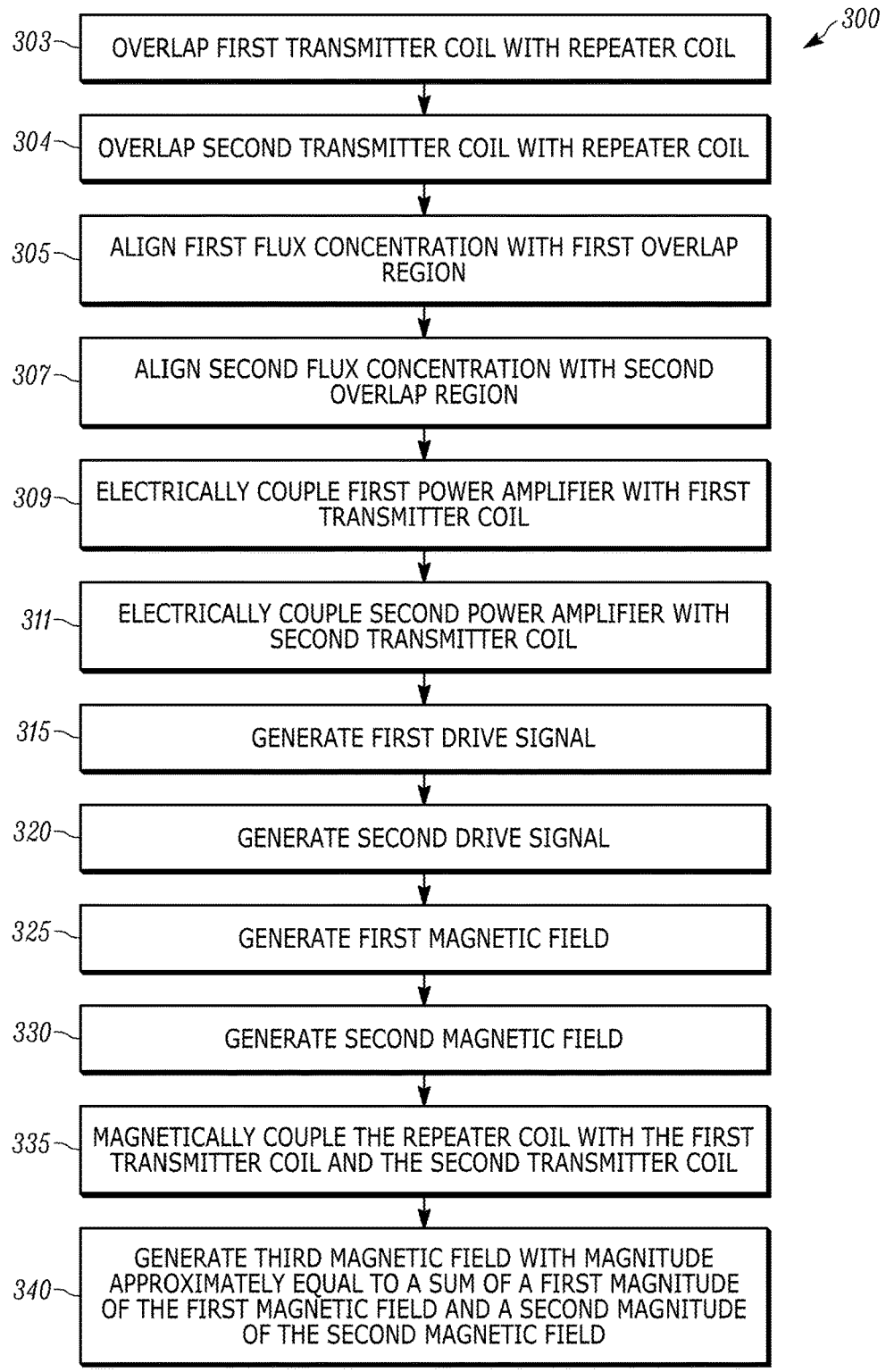
FIG. 3 is flowchart illustrating a method of transferring wireless power using the wireless power transfer device of FIGS. 2A and 2B.

FIG. 3 illustrates an exemplary method 300 of transferring wireless power. As shown in FIG. 3, the method 300 includes overlapping the first transmitter coil 120 with the repeater coil 135 (block 303), which includes overlapping the first portion 190 of the first transmitter coil 120 with the third portion 240 of the repeater coil 135 in a first overlap region 250. The method 300 also includes overlapping the second transmitter coil 130 with the repeater coil 135 (block 304) by overlapping the second portion 210 of the second transmitter coil 130 with the fourth portion 245 of the repeater coil 135 in a second overlap region 255. The method 300 further includes aligning the first flux concentrator 260 with the first overlap region 250 (block 305), and aligning the second flux concentrator 265 with the second overlap region 255 (block 307). Additionally, the method 300 includes electrically coupling the first power amplifier 115 to the first transmitter coil 120 (block 309), and electrically coupling the second power amplifier 125 to the second transmitter coil 130 (block 311). Then, the method 300 includes generating the first drive signal (block 315). As discussed above, the first drive signal is generated by the first power amplifier 115. The method 300 also includes generating the second drive signal (block 320). As also discussed above, the second power amplifier 125 generates the second drive signal. As discussed above, the first power amplifier 115 and the second power amplifier 125 synchronize the first drive signal and the second drive signal according to the internal reference clock 140. Additionally, the second drive signal has a phase difference of 330 degrees with respect to the first drive signal. The method 300 also includes generating a first magnetic field (block 325) and generating a second magnetic field (block 330). The first transmitter coil 120 generates the first magnetic field in response to receiving the first drive signal, and the second transmitter coil 130 generates the second magnetic field in response to receiving the second drive signal. The method 300 further includes magnetically coupling the repeater coil 135 with the first transmitter coil 120 and the second transmitter coil 130 (block 335). The repeater coil 135 magnetically couples to the first transmitter coil 120 and the second transmitter coil 130 in response to the generation of the first magnetic field and the second magnetic field.

Because the repeater coil 135 is magnetically coupled to the first transmitter coil 120 and the second transmitter coil 130, which are independently powered by a first power amplifier 115 and a second power amplifier 125, respectively, the repeater coil 135 can additively combine the magnitude of the first magnetic field and the magnitude of the second magnetic field. Therefore, the method 300 also includes generating a third magnetic field having a magnitude equal to a sum of a first magnitude of the first magnetic field and a second magnitude of the second magnetic field (block 340). Because, however, the first transmitter coil 120, the second transmitter coil 130, the first power amplifier 115, the second power amplifier 125, the repeater coil 135 and the like are not ideal components, the third magnitude of the third magnetic field may be slightly less than the exact sum of the first magnitude of the first magnetic field and the second magnitude of the second magnetic field. The third magnetic field is generated by the repeater coil 135 as a combination of the first magnetic field and the second magnetic field. The phase difference between the first magnetic field and the second magnetic field, as well as the synchronization of the first power amplifier 115 and the second power amplifier 125 with respect to the internal reference clock 140 allows the repeater coil 135 to efficiently combine the first magnetic field and the second magnetic field.

Due to the increased strength of the third magnetic field in comparison with the first magnetic field and/or the second magnetic field, the power transfer area associated with the wireless power transfer device 105 is increased in comparison to using just the first transmitter coil 120 or the second transmitter coil 130. Additionally, the additive combination of the first magnetic field and the second magnetic field also increases the power transfer distance (i.e., the distance between the receiver coil 113 and the wireless power transfer device 105 at which the receiver coil 113 still receives at least 500 milliamps of power from the wireless power transfer device 105) in comparison to using the first transmitter coil 120 and the second transmitter coil 130 without the repeater coil 135. In one exemplary embodiment, the wireless power transfer device 105 provides a current of 640 milliamps (e.g., the current may be slightly lower or higher than 640 milliamps due to the use of non-ideal components) when the receiver coil 113 is 8.5 centimeters apart (e.g., there may be a small difference in the distance between the receiver coil 113 and the wireless power transfer device 105 due to the different non-ideal components used). In the illustrated embodiment, a ratio of power transfer distance to the distance between the first transmitter coil 120 or the second transmitter coil 130 and the repeater coil 135 (e.g., 15 millimeters) is 5.7, when rounded to the nearest tenth. This ratio provides an indication of the compactness of the wireless power transfer device 105 with respect to the power transfer distance associated with the wireless power transfer device 105.

There are a number of other ways in which the power transfer distance may be increased. One is to increase the output power from the power amplifier to the transmitter coil. Another is to increase the size of the transmitter coil. Yet another possible solution is to use a transmitter and repeater arrangement to increase the power transfer distance. All of these mechanisms, however, suffer from one or more deficiencies. Designing and building power amplifiers with high output power can be difficult. Increasing the size of the transmitter coil also increases the size of the wireless power transfer device as a whole. Lastly, transmitter and repeater arrangements are often cumbersome.

Figure 4:
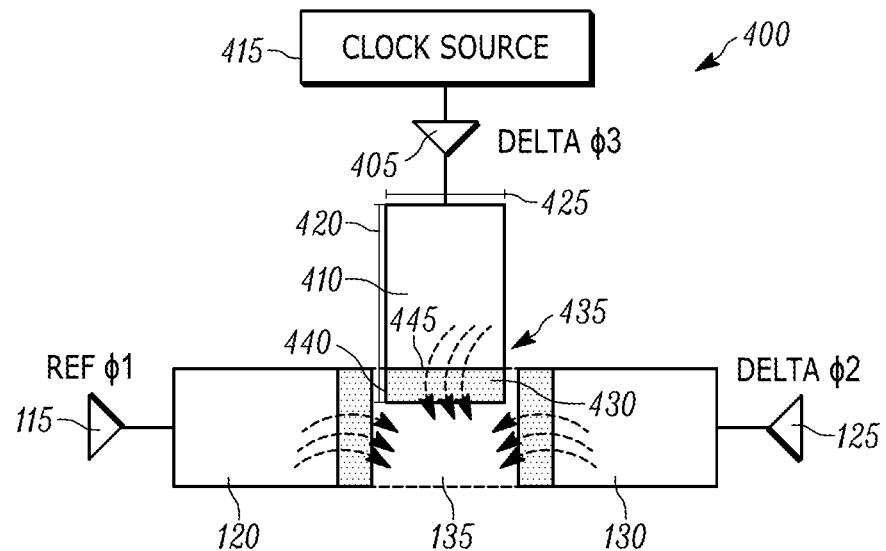
FIG. 4 is a diagram of a second wireless power transfer device.

FIG. 4 illustrates a second wireless power transfer device 400. As shown in FIG. 4, the second wireless power transfer device 400 includes three transmitter coils instead of the two transmitter coils used in the first wireless power transfer device 105. Using three transmitter coils magnetically coupled to a repeater coil allows the repeater coil to additively combine three different magnetic fields, thereby increasing the power transfer distance in comparison to the wireless power transfer device 105 that only additively combines two different magnetic fields. In the example illustrated, the second wireless power transfer device 400 adds a third transmitter coil 410 to the wireless power transfer device 105 described with respect to FIGS. 1 through 3. Accordingly, the second wireless power transfer device 400 includes the first power amplifier 115, the first transmitter coil 120, the second power amplifier 125, the second transmitter coil 130, a third power amplifier 405, a third transmitter coil 410, and the repeater coil 135. The second wireless power transfer device 400 may also include other components similar to the first power transfer device 105 that are not shown in FIG. 4. The specific description of these components may be omitted, but it is understood that their function is similar to that described above with respect to the first wireless power transfer device 105.

The third transmitter coil 410 is electrically coupled to the third power amplifier 405. The third power amplifier 405 generates a third drive signal having a fourth magnitude and a third phase. The third drive signal is provided to the third transmitter coil 410. The third transmitter coil 410 generates a fourth magnetic field in response to receiving the third drive signal from the third power amplifier 405. The third power amplifier 405 is electrically coupled to a third clock source 415 that, in the illustrated embodiment, operates within the frequency range of 6.765 Megahertz (MHz) to 6.795 Megahertz. In some embodiments, the third clock source 415 may operate in different frequency ranges. The third clock source 415 is also electrically coupled to the internal reference clock 140 such that the first drive signal, the second drive signal, and the third drive signal are synchronized according to the internal reference clock 140. Additionally, the first drive signal, the second drive signal, and the third drive signal as generated in the second wireless power transfer device 400, are phase aligned such that the second magnetic field and the fourth magnetic field each has a phase difference with respect to the first magnetic field that maximizes a combination of the first magnetic field, the second magnetic field, and the fourth magnetic field. In the illustrated embodiment, the first power amplifier 115 generates the first drive signal at a reference phase angle, the second power amplifier 125 generates the second dive signal at a phase angle of 290 degrees (e.g., the phase difference may be slightly more or less due to, for example, variations in non-ideal components), and the third power amplifier 405 generates the third drive signal at a phase angle of 210 degrees (e.g., the phase difference may be slightly more or less due to, for example, variations in non-ideal components).

In the second wireless power transfer device 400, the repeater coil 135 is magnetically coupled to the first transmitter coil 120, the second transmitter coil 130, and the third transmitter coil 410. The repeater coil 135 additively combines the first magnetic field, the second magnetic field, and the fourth magnetic field. The repeater coil 135 generates, in response to combining the first magnetic field, the second magnetic field, and the fourth magnetic field, the third magnetic field with the third magnitude equal to a sum of the first magnitude of the first magnetic field, the second magnitude of the second magnetic field, and the fourth magnitude of the fourth magnetic field. Because, however, the first transmitter coil 120, the second transmitter coil 130, the third transmitter coil 410, the first power amplifier 115, the second power amplifier 125, the third power amplifier 405, the repeater coil 135 and the like are not ideal components, the third magnitude of the third magnetic field may be slightly less than the exact sum of the first magnitude of the first magnetic field, the second magnitude of the second magnetic field, and the fourth magnitude of the fourth magnetic field. The phase difference between the first magnetic field, the second magnetic field, and the fourth magnetic field maximizes the third magnitude of the third magnetic field.

The third transmitter coil 410 has a fourth length 420 of eighteen centimeters and a fourth width 425 of twelve centimeters. As stated before, it should be understood that these dimensions are only examples and that other embodiments may have different dimensions. The third transmitter coil 410 includes a fifth portion 430 located at a first longitudinal end 435 of the third transmitter coil 410 along the fourth width 425. The repeater coil 135 also includes a sixth portion 440 as shown in FIG. 4 located at one of the edges 230b (FIG. 2A) along the third length 220 (FIG. 2A).

As shown in FIG. 4, the third transmitter coil 410 is positioned such that the sixth portion 440 of the repeater coil 135 overlaps the fifth portion 430 of the third transmitter coil 410 in a third overlap region 445. As shown in FIG. 4, the size of the third overlap region 445 is also smaller than the size of the third transmitter coil 410 and smaller than the size of the repeater coil 135. In other words, the third transmitter coil 410 and the repeater coil 135 are only partially overlapped. As discussed above with respect to the first overlap region 250, the size of the third overlap region 445 is not arbitrary and is determined based on, for example, one or more of the geometry of the third transmitter coil 410, the geometry of the repeater coil 135, the number of turns in the third transmitter coil 410 or the repeater coil 135, and the like.

The rest of the components of the second wireless power transfer device 400 operate similar to those included in the first power transfer device 105. For example, in the illustrated embodiment, the second wireless power transfer device 400 also includes a third flux concentrator (not shown) that concentrates the fourth magnetic flux between the third transmitter coil 410 and the repeater coil 135. In other words, the third flux concentrator (not shown) maximizes the magnetic flux coupling between the third transmitter coil 410 and the repeater coil 135 while minimizing magnetic losses in the coupling. The third flux concentrator is also aligned with the third overlap region 445 and is positioned between the third transmitter coil 410 and the repeater coil 135. In this position, the third flux concentrator, which in the second wireless power transfer device 400 includes a ferrite material, can improve the return loss when the third transmitter coil 410 and the repeater coil 135 are magnetically coupled due to its material properties. The third flux concentrator, also due to its material properties, has a high permeability (e.g., 120) and low-loss factor (e.g., 0.017).

Additionally, the second wireless power transfer device 400 also includes fifth insulation layer and a sixth insulation layer (not shown) that maintains the third transmitter coil 410 and the repeater coil 135 at an appropriate distance apart. In the illustrated embodiment, the fifth insulation layer and the sixth insulation layer each have a height of 6 millimeters. In some embodiments, the fifth insulation layer and the sixth insulation layer may each have a different height. Therefore, in the illustrated embodiment, the distance between the first transmitter coil 120, the second transmitter coil 130, or the third transmitter coil 410 and the repeater coil 135 is fifteen millimeters. In some embodiments, the distance between the first transmitter coil 120, the second transmitter coil 130, or the third transmitter coil 410 and the repeater coil 135 may be different than the fifteen millimeters specified above.

The repeater coil 135 is magnetically coupled to the first transmitter coil 120, the second transmitter coil 130, and the third transmitter coil 410, which are each independently powered by the first power amplifier 115, the second power amplifier 125, and the third power amplifier 405, respectively. As a consequence, the repeater coil 135 can additively combine the magnitude of the first magnetic field, the magnitude of the second magnetic field, and the magnitude of the fourth magnetic field. The repeater coil 135 then generates the third magnetic field having a magnitude equal to a sum of a magnitude of the first magnetic field, a magnitude of the second magnetic field, and a magnitude of the fourth magnetic field. Because, however, the first transmitter coil 120, the second transmitter coil 130, the third transmitter coil 410, the first power amplifier 115, the second power amplifier 125, the third power amplifier 405, the repeater coil 135 and the like are not ideal components, the third magnitude of the third magnetic field may be slightly less than the exact sum of the first magnitude of the first magnetic field, the second magnitude of the second magnetic field, and the fourth magnitude of the fourth magnetic field. The phase difference between the first magnetic field, the second magnetic field, and the fourth magnetic field, as well as the synchronization of the first power amplifier 115, the second power amplifier 125, and the third power amplifier 405 with respect to the internal reference clock 140 allows the repeater coil 135 to efficiently combine the first magnetic field, the second magnetic field, the fourth magnetic field.

Due to the increased strength of the third magnetic field in comparison with the first magnetic field and/or the second magnetic field, the power transfer area associated with the second wireless power transfer device 400 is increased in comparison to using just the first transmitter coil 120 or the second transmitter coil 130. Additionally, the additive combination of the first magnetic field, the second magnetic field, and the fourth magnetic field also increases the power transfer distance in comparison to using the first transmitter coil 120, the second transmitter coil 130, and the third transmitter coil 410 without the repeater coil 135. In one exemplary embodiment, the second wireless power transfer device 400 provides a current of 950 milliamps (e.g., the current may be slightly lower or higher than 950 milliamps due to the use of non-ideal components) when the receiver coil 113 is 8.5 centimeters apart (e.g., there may be a small difference in the distance between the receiver coil 113 and the second wireless power transfer device 400 due to the different non-ideal components used), and the same exemplary embodiment or a different embodiment provides a current of 100 milliamps (e.g., the current may be slightly lower or higher than the 100 milliamps due to the use of non-ideal components) when the receiver coil 113 is 16.5 centimeters apart (e.g., there may be a small difference in the distance between the receiver coil 113 and the second wireless power transfer device 400 due to the different non-ideal components used). In the illustrated embodiment, a ratio of the power transfer distance to the distance between the first transmitter coil 120, the second transmitter coil 130, or the third transmitter coil 410, and the repeater coil 135 is 11, when rounded. This ratio provides an indication of the compactness of the second wireless power transfer device 400 with respect to the power transfer distance associated with the wireless power transfer device 400.

Figure 5:
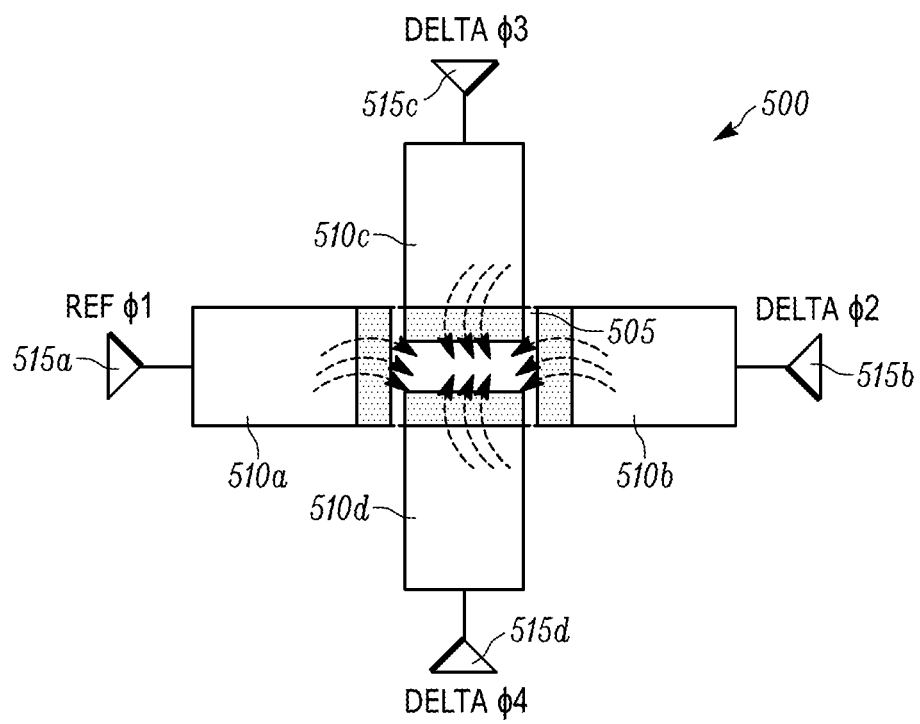
FIG. 5 is a diagram of a third wireless power transfer device.

As demonstrated with the description of the second wireless device 400, the wireless power transfer device 105 can be expanded such that a plurality of transmitter coils, each individually powered by a power amplifier, are magnetically coupled to repeater coil. The more transmitter coils that are magnetically coupled to the repeater coil, the stronger (i.e., greater magnitude) the magnetic field generated by the repeater coil is. FIG. 5 illustrates a diagram of a third wireless power transfer device 500. The third wireless power transfer device 500 includes a repeater coil 505 that is magnetically coupled to a plurality of transmitter coils 510*a* through 510*d*, each of which is individually powered by one of a plurality of power amplifiers 515*a* through 515-*d*. To have the repeater coil 505 additively combine the magnetic fields generated by the plurality of magnetic fields from the plurality of transmitter coils 510*a* through 510*d*, the drive signals generated by each of the plurality of power amplifiers 515*a* through 515*d* are synchronized with an internal clock source and are phase aligned to maximize the superposition of the plurality of magnetic fields. Therefore, the third wireless power transfer device 500 is associated with a greater power transfer distance than the first wireless power transfer device 105 and the second wireless power transfer device 400.

Figure 6:
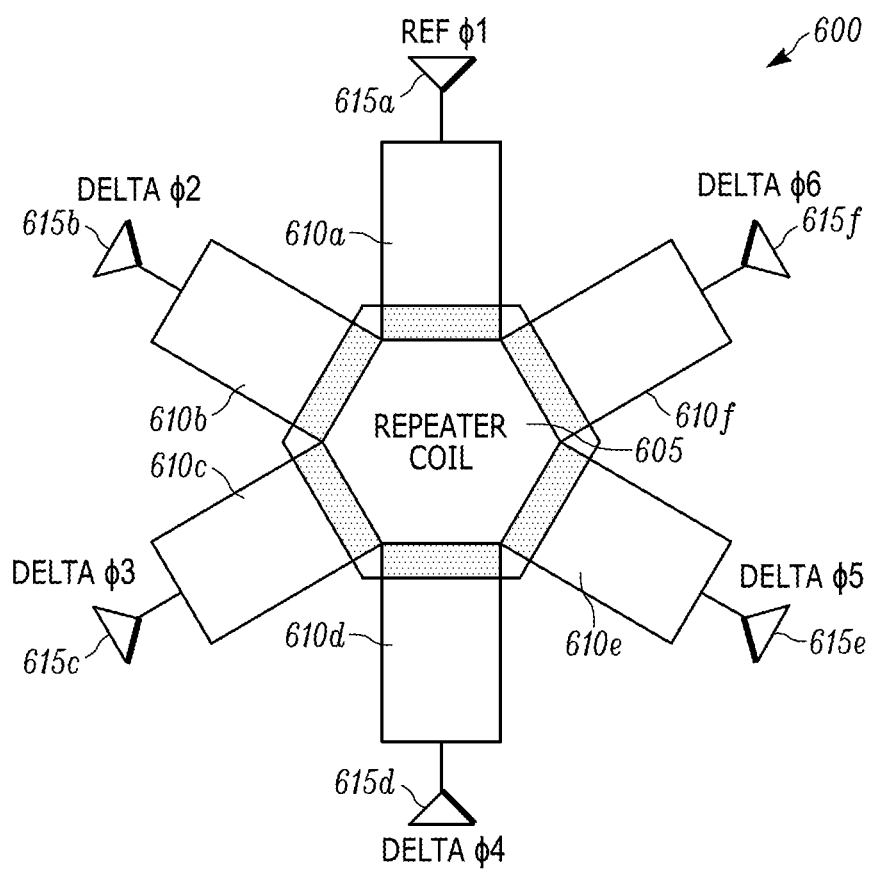
FIG. 6 is a diagram of a fourth wireless power transfer device.

FIG. 6 illustrates a fourth wireless power transfer device 600. The fourth wireless power transfer device 600 includes a repeater coil 605 that is hexagonally shaped. Due to its hexagonal shape, the repeater coil 605 may magnetically couple to a maximum of six different transmitter coils 610*a* through 610*f*, each of which is individually powered by one of a plurality of power amplifiers 615*a* through 615*f*. To have the repeater coil 605 additively combine the magnetic fields generated by the plurality of transmitter coils 610*a* through 610*f*, the drive signals generated by each of the plurality of power amplifiers 615*a* through 615*f* are synchronized with an internal clock source and are phase aligned to maximize the additive superposition of the plurality of the magnetic fields. Therefore, the fourth wireless power transfer device 600 is associated with a greater transfer distance than the first wireless power transfer device 105, the second wireless power transfer device 400, and the third wireless power transfer device 500. Additionally, the distance between the repeater coil 605 and each of the transmitter coils 610*a* through 610*f* remains the same (for example, fifteen millimeters), which provides a greater ratio of power transfer distance to distance between the repeater coil 605 and each of the transmitter coils 610*a*-*f*.

Figure 7:
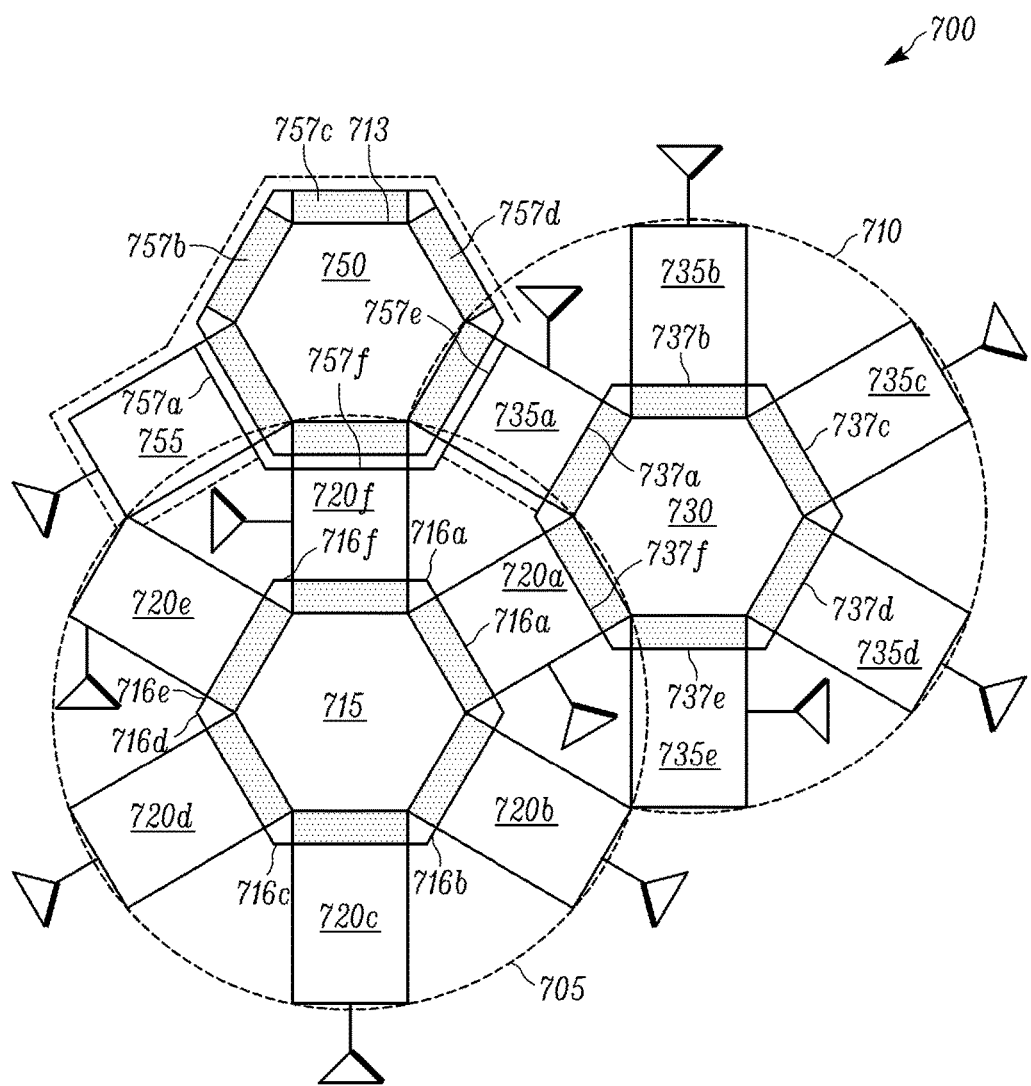
FIG. 7 is a diagram of a fifth wireless power transfer device.

FIG. 7 illustrates a modular fifth wireless power transfer device 700. The fifth wireless power transfer device 700 is an expandable power transfer device 700 because it includes a first wireless power transfer array 705, a second wireless power transfer array 710, and a third wireless power transfer array 713. The first wireless power transfer array 705 includes a hexagonal repeater coil 715 (similar to the hexagonal repeater coil 605 shown in FIG. 6) magnetically coupled to a first plurality of transmitter coils 720*a* through 720*f*. The first repeater coil 715 includes a first plurality of edges 716*a* through 716*f*. The first repeater coil 715 is magnetically coupled to the first plurality of transmitter coils 720*a* through 720*f* at the first plurality of edges 716*a* through 716*f*. Each of the first plurality of transmitter coils 720*a* through 720*f* are electrically coupled and powered by a first plurality of power amplifiers. The first plurality of transmitter coils 720 *a* through 720*f* generate a first plurality of magnetic fields that are phase aligned to be additively combined with the rest of the first plurality of magnetic fields (i.e., with each other). The hexagonal repeater coil 715 is magnetically coupled to each of the first plurality of transmitter coils 720*a* through 720*f* and additively combines the first plurality of magnetic fields and generates a first magnetic field with a magnitude equal to a sum of the magnitudes of the first plurality of magnetic fields. Because, however, the first plurality of transmitter coils 720*a* through 720*f* and the like are not ideal components, the magnitude of the first magnetic field generated by the hexagonal repeater coil 715 may be slightly less than the exact sum of the magnitudes of the first magnetic fields generated by the first plurality of transmitter coils 720*a* through 720*f*.

The second wireless power transfer array 710 includes a second hexagonal repeater coil 730 magnetically coupled to a second plurality of transmitter coils 735*a* through 735*e*. The second repeater coil 730 includes a second plurality of edges 737a through 737f. The second hexagonal repeater coil 730 is magnetically coupled to the second plurality of transmitter coils 735a through 735e, and to one of the first plurality of transmitter coils 720a. The second plurality of transmitter coils 735a through 735e generate a second plurality of magnetic fields that are phase aligned to be additively combined with each other. The second hexagonal repeater coil 730 additively combines the second plurality of magnetic fields and one of the first plurality of magnetic fields to generate a second magnetic field with a magnitude equal to a sum of the magnitudes of the second plurality of magnetic fields and one of the first plurality of magnetic fields (e.g., magnetic field generated by transmitter coil 720a of the first plurality of transmitter coils 720a through 720f). Because, however, the components used are not ideal components, the magnitude of the second magnetic field generated by the second hexagonal repeater coil 730 may be slightly less than the exact sum of the magnitudes of the second plurality of magnetic fields and one of the first plurality of magnetic fields.

As shown in FIG. 7, the first repeater coil 715 of the first wireless power transfer array 705 has every edge of the first plurality of edges 716a through 716f magnetically coupled to one of the first plurality of transmitter coils 720a through 720f. The second repeater coil 730 also has every edge of the second plurality of edges 737a through 737f magnetically coupled to one of the second plurality of transmitter coils 735a through 735f. Therefore, both the first wireless power transfer array 705 and the second wireless power transfer array 710 have a maximum number of transmitter coils 720a through 720f and 735a through 735e magnetically coupled to the first repeater coil 715 and to the second repeater coil 730. The third wireless power transfer array 713 includes a third repeater coil 750 and one transmitter coil 755. The third repeater coil 750 includes a third plurality of edges 757a through 757f defining a third perimeter of the third repeater coil 750. The third repeater coil 750 is magnetically coupled to the one transmitter coil 755, to one of the first plurality of transmitter coils 720f, and to one of the second plurality of transmitter coils 735a. The third repeater coil 750, however, still has a plurality of edges 757b through 757d that remain magnetically uncoupled to any transmitter coils. These plurality of edges 757b through 757d therefore provide an expandable capability to the fifth wireless power transfer device 700. In other words, while these plurality of edges 757b through 757d are, in the illustrated embodiment, uncoupled to any transmitter coils, transmitter coils and/or an additional wireless power transfer array may be added to any one of the uncoupled plurality of edges 757b through 757d.

Each wireless power transfer array 705, 710, 713 may be magnetically coupled and decoupled from each other to produce different sizes of wireless power transfer devices 700 being associated with different power transfer areas and power transfer distances. The power transfer area and the power transfer distance of a wireless power transfer device 700 may be expanded by adding and magnetically coupling an additional wireless power transfer array to an existing wireless power transfer array of the wireless power transfer device 700. Therefore, by using modular wireless power transfer arrays, the power transfer area and/or the power transfer distance can be easily modified and adjusted for specific applications.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A wireless power transfer device comprising:
   a first power amplifier configured to generate a first drive signal;
   a first transmitter coil electrically coupled to the first power amplifier, and configured to generate a first magnetic field having a first magnitude in response to receiving the first drive signal;
   a second power amplifier configured to generate a second drive signal;
   a second transmitter coil electrically coupled to the second power amplifier, and configured to generate a second magnetic field having a second magnitude in response to receiving the second drive signal; and
   a repeater coil magnetically coupled to the first transmitter coil and the second transmitter coil, and configured to combine the first magnetic field and the second magnetic field to generate a third magnetic field having a third magnitude, wherein the third magnitude is greater than the first magnitude and is also greater than the second magnitude, the repeater coil configured to magnetically transfer power to an external device.

2. The wireless power transfer device of claim 1, wherein the third magnitude is equal to or less than a sum of the first magnitude and the second magnitude.

3. The wireless power transfer device of claim 1, wherein the second drive signal has a phase difference with respect to the first drive signal.

4. The wireless power transfer device of claim 3, wherein the phase difference with respect to the first drive signal is three hundred (330) degrees.

5. The wireless power transfer device of claim 1, wherein the first drive signal and the second drive signal are synchronized with an internal reference clock.

6. The wireless power transfer device of claim 1, wherein:
   the first transmitter coil includes a first portion;
   the second transmitter coil includes a second portion; and
   the repeater coil includes a third portion and a fourth portion, and wherein the repeater coil is positioned with respect to the first transmitter coil such that the first portion and the third portion overlap in a first overlap region, and wherein the repeater coil is positioned with respect to the second transmitter coil such that the second portion and the fourth portion overlap in a second overlap region.

7. The wireless power transfer device of claim 6, further comprising a first flux concentrator aligned with the first overlap region and configured to concentrate a first magnetic flux of the first magnetic field.

8. The wireless power transfer device of claim 7, further comprising a second flux concentrator aligned with the second overlap region, and configured to concentrate a second magnetic flux of the second magnetic field.

9. The wireless power transfer device of claim 8, wherein a spacing of the first flux concentrator between the first transmitter coil and the repeater coil, and a spacing of the second flux concentrator between the second transmitter coil and the repeater coil are configured to provide a maximum power transfer.

10. The wireless power transfer device of claim 9, wherein a ratio of a power transfer distance to a distance between the first transmitter coil and the second transmitter coil is at least 5.

11. The wireless power transfer device of claim 1, further comprising a third power amplifier configured to generate a third drive signal, and a third transmitter coil electrically coupled to the third power amplifier and configured to generate a fourth magnetic field having a fourth magnitude in response to receiving the third drive signal, wherein the repeater coil is magnetically coupled to the first transmitter coil, the second transmitter coil, and the third transmitter coil, and wherein the third magnitude of the third magnetic field is equal to or less than a sum of the first magnitude, the second magnitude, and the fourth magnitude.

12. A method of wirelessly transferring power with a wireless power transfer device having a first transmitter coil, a second transmitter coil, and a repeater coil, the method comprising:
   electrically coupling a first power amplifier to the first transmitter coil;
   generating a first drive signal with the first power amplifier;
   electrically coupling a second power amplifier to the second transmitter coil;
   generating a second drive signal with the second power amplifier;
   generating, with the first transmitter coil, a first magnetic field having a first magnitude in response to receiving the first drive signal;
   generating, with the second transmitter coil, a second magnetic field having a second magnitude in response to receiving the second drive signal;
   magnetically coupling the first transmitter coil and the second transmitter coil with a repeater coil; and
   combining the first magnetic field and the second magnetic field to generate, with the repeater coil, a third magnetic field having a third magnitude, wherein the third magnitude is greater than the first magnitude and is also greater than the second magnitude.

13. The method of claim 12, wherein generating the third magnetic field having the third magnitude includes generating the third magnetic field having the third magnitude that is equal to or less than a sum of the first magnitude and the second magnitude.

14. The method of claim 12, wherein generating the second drive signal includes generating the second drive signal having a phase difference with respect to the first drive signal.

15. The method of claim 14, wherein generating the second drive signal having a phase difference with respect to the first drive signal includes generating the second drive signal having three hundred (330) degrees phase difference with respect to the first drive signal.

16. The method of claim 12, wherein generating the second drive signal includes generating the second drive signal that is synchronized with the first drive signal according to an internal reference clock.

17. The method of claim 12, wherein the first transmitter coil includes a first portion, the second transmitter coil includes a second portion, and the repeater coil includes a third portion and a fourth portion, and further comprising:
overlapping the first portion of the first transmitter coil with the third portion of the repeater coil in a first overlap region; and
overlapping the second portion of the second transmitter coil with the fourth portion of the repeater coil in a second overlap region.

18. The method of claim 17, further comprising:
aligning a first flux concentrator with the first overlap region to concentrate a first magnetic flux of the first magnetic field; and
aligning a second flux concentrator with the second overlap region to concentrate a second magnetic flux of the second magnetic field.

19. The method of claim 18, further comprising spacing the first flux concentrator between the first transmitter coil and the repeater coil to maximize a power transfer, and spacing the second flux concentrator between the second transmitter coil and the repeater coil to maximize the power transfer.

20. The method of claim 12, further comprising:
generating a third drive signal with a third power amplifier;
generating, with a third transmitter coil, a fourth magnetic field having a fourth magnitude in response to receiving the third drive signal; and
magnetically coupling the third transmitter coil with the repeater coil,
wherein generating the third magnetic field includes generating, with the repeater coil, the third magnetic field having a third magnitude that is equal to or less than a sum of the first magnitude, the second magnitude, and the fourth magnitude.

21. A wireless power transfer system comprising:
a wireless power transfer device including:
a wireless power transfer array having:
a first plurality of power amplifiers configured to generate a first plurality of drive signals,
a first plurality of transmitter coils configured to generate a first plurality of magnetic fields, each transmitter coil electrically coupled to one of the first plurality of power amplifiers, each magnetic field being phase aligned to be additively combined with the rest of the first plurality of magnetic fields, and
a first repeater coil magnetically coupled to the first plurality of transmitter coils, and configured to additively combine the plurality of magnetic fields from the plurality of transmitter coils,
wherein the wireless power transfer device is associated with a predetermined power transfer area and a predetermined power transfer distance; and
an external device including a receiver coil magnetically coupled to the first repeater coil and configured to receive wireless power from the wireless power transfer device when the receiver coil is positioned within the predetermined power transfer area and the predetermined power transfer distance.

22. The wireless power transfer system of claim 21, wherein the wireless power transfer device further includes a second wireless power transfer array magnetically coupled to the first wireless power transfer array to increase the predetermined power transfer area and the predetermined power transfer distance, the second wireless power transfer array including a second repeater coil.

23. The wireless power transfer system of claim 22, wherein the second repeater coil is magnetically coupled to one of the first plurality of transmitter coils.

24. The wireless power transfer system of claim 23, wherein the second wireless power transfer array includes:
a power amplifier configured to generate a drive signal, the power amplifier being separate from the first plurality of power amplifiers,
a transmitter coil, separate from the first plurality of transmitter coils, electrically coupled to the power amplifier, and configured to generate a third magnetic field in response to receiving the drive signal.

25. The wireless power transfer system of claim 22, wherein the first repeater coil includes a first plurality of edges defining a perimeter of the first repeater coil, and wherein the first repeater coil is magnetically coupled to the first plurality of transmitter coils at the first plurality of edges.

* * * * *